Figure 1:
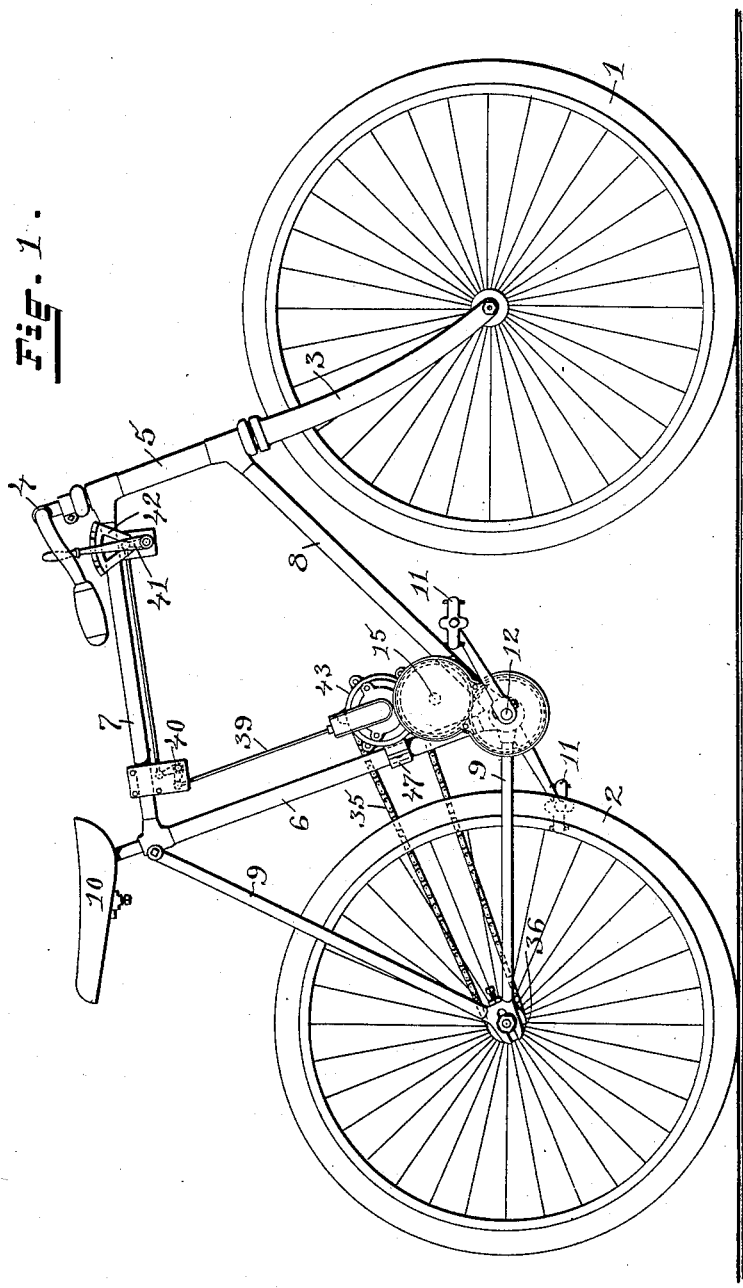

(No Model.)

W. CORLISS.
BICYCLE.

No. 596,695.

3 Sheets—Sheet 1.

Patented Jan. 4, 1898.

WITNESSES:
M. F. Bligh.
Chas. H. Luther Jr.

INVENTOR:
William Corliss.
by Joseph A. Miller & Co.
Attys.

THE NORRIS PETERS CO., PHOTO-LITHO., WASHINGTON, D. C.

(No Model.)   3 Sheets—Sheet 3.

W. CORLISS.
BICYCLE.

No. 596,695. Patented Jan. 4, 1898.

WITNESSES:
M. F. Bligh.
Chas. H. Luther Jr

INVENTOR:
William Corliss,
by Joseph A. Miller & Co.,
Attys.

UNITED STATES PATENT OFFICE.

WILLIAM CORLISS, OF PROVIDENCE, RHODE ISLAND.

BICYCLE.

SPECIFICATION forming part of Letters Patent No. 596,695, dated January 4, 1898.

Application filed May 20 1896. Serial No. 592,268. (No model.)

*To all whom it may concern:*

Be it known that I, WILLIAM CORLISS, of the city of Providence, county of Providence, and State of Rhode Island, have invented a new and useful Improvement in Bicycles; and I hereby declare that the following is a full, clear, and exact description of the same, reference being had to the accompanying drawings, forming part of this specification.

This invention has reference to an improvement in bicycles; and it consists in the peculiar and novel construction of a changeable-speed gear and mechanism for operating the same, as will be more fully set forth hereinafter and more particularly pointed out in the claims.

To secure the best practical results with a bicycle, the rider must be enabled to readily adapt the machine to the varying conditions of the road and to his own condition. On a smooth hard level or nearly level road, where the cycle meets the least resistance, the rider wants to travel at the highest possible speed. On a sandy road the resistance to the wheels is greater and the speed must be diminished. The same is true when ascending a hill or an upward grade in the road. As each rider has what may be termed a "constitutional speed capacity," at which he can move the pedals with the greatest endurance, it becomes necessary in producing the best practical results to maintain this natural movement of the feet of the rider and vary the speed of the machine by transmitting the motion of the pedal or crank-shaft to the driving-wheel at varying speeds. In bicycles such a change of speed requires to be instantaneous, for if the rider at high speed reaches a rising grade in the road that he cannot with normal exertion ascend at the high speed and wishes to change to a lower speed the speed-changing mechanism must be constructed so that the instant the high-speed gear is disconnected from the power-transmitting mechanism the lower-speed gear is connected with the same, and ought to be so connected without slip or shock, for if both are disconnected the machine will run backward downhill by the force of gravity, as the pedals are disconnected and give the rider no control of the machine.

One object of this invention is to give the rider complete control to vary the speed of the bicycle at will.

Another object of the invention is to make the change of speed instantaneous and practically maintain the connection between the pedals and the driving-wheel to fully control the machine.

Another object of the invention is to make the change in the speed without the shock and blow incident to a change in speed in speed-changing mechanism, as heretofore described; and a further object of my invention is to so construct the driving-gear that the same may be contained in compact form in a case secured to the frame of the bicycle.

Figure 2:
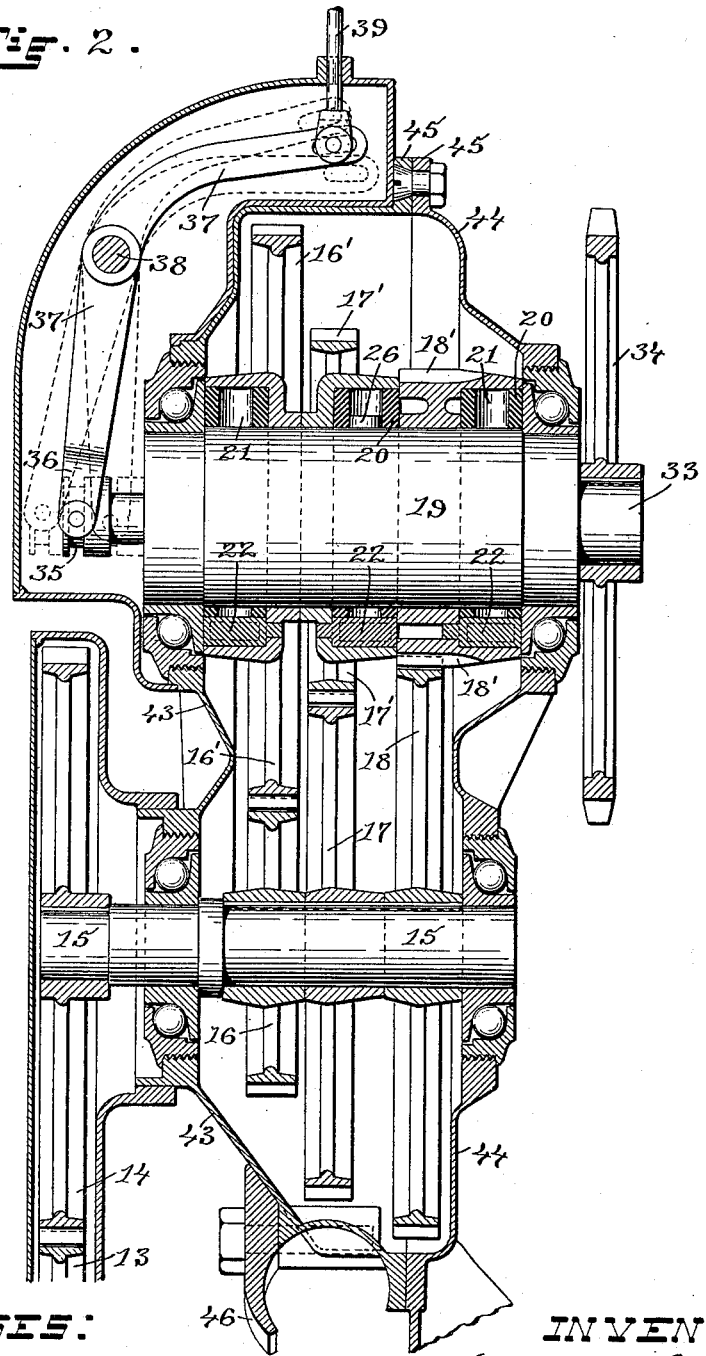
Figure 3:
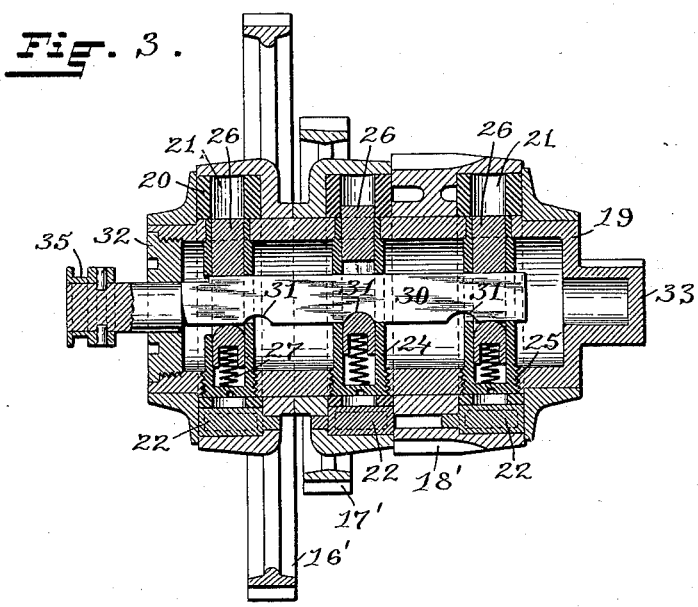
Figure 4:
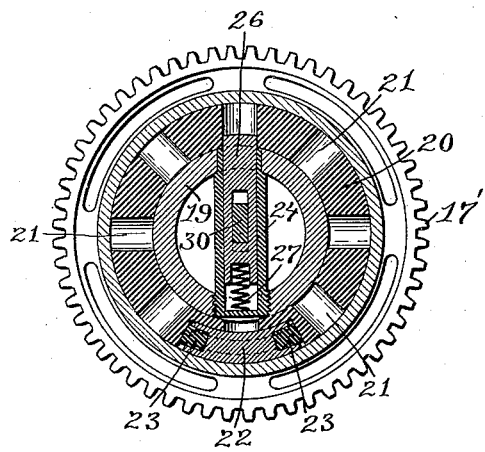
Figure 5:
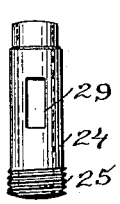
Figure 6:
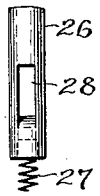

Figure 1 is a side view of a bicycle provided with my improved driving mechanism. Fig. 2 is an enlarged vertical transverse sectional view of the improved speed-changing mechanism. Fig. 3 is a sectional view of the locking mechanism and the loose gears supported on the tubular shaft. Fig. 4 is a sectional view of the locking mechanism, showing one of the gears locked to the tubular shaft. Fig. 5 is a side view of one of the locking-bolt cases, and Fig. 6 a side view of one of the locking-bolts.

Similar numerals of reference indicate corresponding parts in all the figures.

In the drawings, 1 indicates the front wheel; 2, the driving-wheel; 3, the spindle-fork; 4, the handle-bar, connected with the spindle of the fork; 5, the spindle-tube; 6, the saddle-post; 7, the upper strut, and 8 the lower strut, which connect the spindle-tube and saddle-post to form the main frame; 9, the rear brackets, which form the bearings for the driving-wheel.

10 indicates the saddle, 11 11 the pedals, and 12 the crank-shaft.

The parts so far recited are the essential parts of a bicycle, such as is shown in Fig. 1 of the drawings, in which the crank-shaft is supported at the lower part of the saddle-post, and my improved speed-changing mechanism is herein shown adapted for this form of bicycle-frame by providing the crank-shaft with a gear engaging with a similar gear on the shaft, to which the series of graduated gears are secured, whereby the improved speed-changing gears may be supplied to bicycles of this construction.

The gear secured to the crank-shaft 12 is indicated by 13, and a portion of this gear is shown in Fig. 2 in gear with the gear 14, secured to the shaft 15, to which the graduated gears 16, 17, and 18 are also secured. The gears 13 and 14 transmit the motion of the crank-shaft 12 to the shaft 15. The gears 16', 17', and 18' are mounted loose on the tubular shaft 19 and are in engagement with the corresponding gears 16, 17, and 18, but do not transmit power until they are connected with and rotate with the shaft 19. To this end the hubs of the gears 16', 17', and 18' are recessed and provided each with a ring 20, fitting into the recess of the hub, having a sliding contact with the same and with the tubular shaft 19. The ring 20 is provided with a large number of the openings 21, and is also provided with a transverse recess, into which is placed the abutment 22, which is secured to the hub of the gear. This abutment 22 is provided with the springs 23, one at each end. These springs bear against the ring 20.

Transversely to the axis of the tubular shaft 19, on a line with each of the rings 20, is secured the tube 24, closed at one end and provided with the screw-thread 25 at the closed end. The opposite open end is reduced in diameter, so as to form a shoulder. These tubes 24 are secured by screwing them into the tubular shaft, as shown in Figs. 3 and 4. The bolts 25 fit in the tubes 24 with a loose sliding fit and are provided with or rest on the spiral springs 27. These bolts are provided with the slots 28, the lower end having a convex shoulder. The tubes 24 are provided with the slots 29. The bolts are controlled by the slide 30, which extends through and has capacity to slide in the slots 29 of the tubes 24 and the slots 28 of the bolts 26. The slide 30 is provided with the concaved recesses 31, corresponding with the convex sections of the bolts 26 at the lower ends of the slots 28. The concaved recesses 31 are so placed on the slide 30 with reference to the bolts that when the convex section of one bolt is entered in the concave recess on the slide the other concaved recesses 31 are with one edge slightly beyond or at one side of the convex sections of the other bolts, whereby, as shown in Fig. 3, when the slide 30 is moved longitudinally in either direction a distance equal to one-half the diameter of one of the bolts the central bolt will be withdrawn from the recess 21 in the ring, and a slight further movement of the slide will permit another bolt to enter the corresponding recess in the slide 30 and a recess 21 in the corresponding ring 20 of the gear with which it is connected. By this construction, in connection with the numerous recesses or openings 21 in the rings, the change from one speed to the other is practically instantaneous.

The slide 30 extends through the screw-plug 32 with a close sliding fit, the screw-plug closing the end of the tubular shaft 19. The tubular shaft, with the slide and locking-bolts, is tightly closed and may contain oil for lubrication without loss by leakage. The projection 33 forms the support for the sprocket-gear 34. The projecting end of the slide is provided with the annular groove 35, with which the forked end 36 of the lever 37 engages. The lever is supported on the pivot 38 and is bent so as to form a bell-crank lever, to the upper end of which the rod 39 is secured, preferably by a pin extending through a slot, so that the rod 39 may extend through the casing with a close sliding fit. The upper end of the rod 39 is secured to the bell-crank lever 40, supported on a bracket connected to the upper strut 7, and the bell-crank 40 is connected with the preferably spring hand-lever 41, pivotally supported on the segment-bracket 42, provided with notches in which the hand-lever is held in the positions when the slide 30 permits one end of the bolts 25 to connect with the ring of one of the gears. By moving the hand-lever 41 from one notch to another the slide 30 is operated through the bell-crank levers 40 and 37 to connect one of the gears 16', 17', or 18' with the tubular shaft and thereby transmit the power exerted on the pedal-shaft at varying speed. From the sprocket-gear 34 the chain 35 extends to and around the sprocket-gear 36 on the shaft of the rear or driving wheel 2, and motion at varying speeds is thus transmitted to the driving-wheel.

A varying-speed gear for a bicycle to be of practical value must be adapted to the frame. It must not obstruct in any way the movement of the rider and must be constructed and protected so as to transmit the power with the least possible loss by friction. To these ends I use a series of graduated gears of considerable diameter, but narrow rim, and mount them so as to turn in the plane of the bicycle-frame. These gears are accurately shaped, so as to cause the least possible friction, and I inclose the gears in a dust and oil tight compact casing. The width transversely to the frame of the bicycle is about the diameter of the usual saddle-post 6, while the extreme transverse width of the whole apparatus, including the gear-wheel 13 on the pedal-shaft and the sprocket-wheel 34, is within the distance between the usual pedal-cranks of a bicycle.

The casing for the speed-changing gear proper is made in two parts, the part 43 forming one side and the part 44 the other side of the case. The two parts are provided with the flanges 45 and are secured together by screw-bolts. The sides of the casing form the races for the ball-bearings of the shafts 15 and 19. The casing is provided with the bracket 46, by which this part is secured to the lower strut 8, and with the lug 47, by which the casing is secured to the saddle-post 6. The casing is not only firmly secured to the saddle-post 6 and lower strut 8, but partially incloses the strut 8 and stiffens the frame of the bicycle at this part of the machine. The casing is made practically oil-tight. The gearing may be lubricated by placing oil into the casing. The gears will lift the oil as they revolve and cause every part to be thoroughly lubricated. The gears 13 and 14, as also the lever 37, are preferably inclosed in suitable casings, as shown in Figs. 1 and 2.

Having thus described my invention, I claim as new and desire to secure by Letters Patent—

1. In a bicycle, the combination with the pedal-shaft, of a gear-wheel secured to the pedal-shaft, an intermediate shaft provided with a gear-wheel gearing with the gear-wheel on the pedal-shaft and with a series of graduated gears, and a tubular shaft provided with a series of graduated gears normally loose on the shaft, of a locking device, consisting of a series of bolts carried by the tubular shaft, a series of openings in the hubs of the gears extending radially from the tubular shaft and a slide constructed to control the operation of the bolts, whereby any one of the normally loose gears may be connected with and disconnected from the tubular shaft and the speed of the bicycle varied, as described.

2. In a bicycle, the combination with the pedal-shaft, an intermediate shaft and a tubular shaft supported in suitable bearings one above the other and parallel with each other, of the gears connecting the pedal-shaft with the intermediate shaft, the graduated gears secured to the intermediate shaft, the graduated gears connecting therewith and loose on the tubular shaft, radial openings in the hubs of the loose gears, radially-sliding bolts carried by the tubular shaft, and an operating-slide controlling the radial bolts, whereby any one of the normally loose gears may be connected with the tubular shaft and the power transmitted at varying speed, as described.

3. The combination with the tubular shaft 19, and the gears normally loose on the shaft the hubs of which are provided with a series of radial openings, of the tubular cases 24, the spring-bolts 26 and the slide 30, whereby the gears are connected with and disconnected from the tubular shaft, as described.

4. The combination with the hub of the gear and the tubular shaft, of the tube 24, the bolt 26, the ring 20, the series of openings 21 in the ring, the abutment 22 secured to the hub, and the springs 23 23, whereby when the gear is connected with the shaft the blow of the ring on the abutment is taken up by the springs, as described.

5. The combination with the tubular shaft 19 and the gears 16', 17' and 18', the rings 20 and abutments 22 secured in the hubs of the gears, of the tubes 24 closed at one end and secured transversely to the axis in the tubular shaft, the bolts 26, the springs 27, the tubes 24 and bolts 26 being provided with slots, and the slide 30 provided with the recesses 31 adapted to control the interlocking of the bolts with the rings, as described.

In witness whereof I have hereunto set my hand.

WILLIAM CORLISS.

Witnesses:
JOSEPH A. MILLER,
JOSEPH A. MILLER, Jr.